(12) United States Patent
Takahashi et al.

(10) Patent No.: US 11,394,260 B2
(45) Date of Patent: Jul. 19, 2022

(54) ROTOR, MOTOR, FAN, AND AIR CONDITIONING APPARATUS

(71) Applicant: Mitsubishi Electric Corporation, Tokyo (JP)

(72) Inventors: Ryogo Takahashi, Tokyo (JP); Hiroki Aso, Tokyo (JP); Takaya Shimokawa, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 342 days.

(21) Appl. No.: 16/603,971

(22) PCT Filed: Aug. 4, 2017

(86) PCT No.: PCT/JP2017/028371
§ 371 (c)(1),
(2) Date: Oct. 9, 2019

(87) PCT Pub. No.: WO2019/026273
PCT Pub. Date: Feb. 7, 2019

(65) Prior Publication Data
US 2020/0153298 A1    May 14, 2020

(51) Int. Cl.
H02K 1/28    (2006.01)
H02K 1/2706    (2022.01)
H02K 7/00    (2006.01)

(52) U.S. Cl.
CPC ............. *H02K 1/28* (2013.01); *H02K 1/2706* (2013.01); *H02K 7/003* (2013.01)

(58) Field of Classification Search
CPC ..... F24F 1/0018; H02K 7/003; H02K 1/2706; H02K 1/28

USPC ...................... 310/156.08, 216.121
See application file for complete search history.

(56) References Cited

U.S. PATENT DOCUMENTS

2014/0042834 A1    2/2014 Asahi et al.
2016/0233747 A1    8/2016 Aso et al.

FOREIGN PATENT DOCUMENTS

| CN | 103580325 A | 2/2014 |
| JP | H08-065930 A | 3/1996 |
| JP | 2004-297935 A | 10/2004 |
| JP | 2011-120335 A1 | 6/2011 |
| JP | 2011-182571 A | 9/2011 |
| JP | 2012-244783 A | 12/2012 |
| JP | 2014-107939 A | 6/2014 |
| JP | 2015/056344 A1 | 4/2015 |
| JP | 2015-204734 A | 11/2015 |

(Continued)

OTHER PUBLICATIONS

International Search Report of the International Searching Authority dated Oct. 24, 2017 for the corresponding International application No. PCT/JP2017/028371 (and English translation).

(Continued)

*Primary Examiner* — Terrance L Kenerly
(74) *Attorney, Agent, or Firm* — Posz Law Group, PLC

(57) ABSTRACT

A rotor includes: a shaft; a rotor core having an annular shape and surrounding the shaft from outside in a radial direction about a center axis line of the shaft so as to leave a space therebetween; a magnet embedded in the rotor core; and a connecting portion disposed between the shaft and the rotor core and formed of a nonmagnetic material.

23 Claims, 13 Drawing Sheets

(56) References Cited

FOREIGN PATENT DOCUMENTS

WO    2017/026065 A1    2/2017
WO    2017/098907 A1    6/2017

OTHER PUBLICATIONS

Office Action dated May 7, 2021, issued in corresponding CN Patent Application No. 201780092691.4 (and English Machine Translation).
Office Action dated Jun. 2, 2020 in corresponding JP application No. 2019-533857 (and English translation).
Office Action dated Jan. 27, 2022 in connection with counterpart Chinese Patent Application No. 201780092691.4 (and a machine English translation).
Office Action dated May 13, 2022 in connection with counterpart Chinese Patent Application No. 201780092691.4 (with machine English translation).

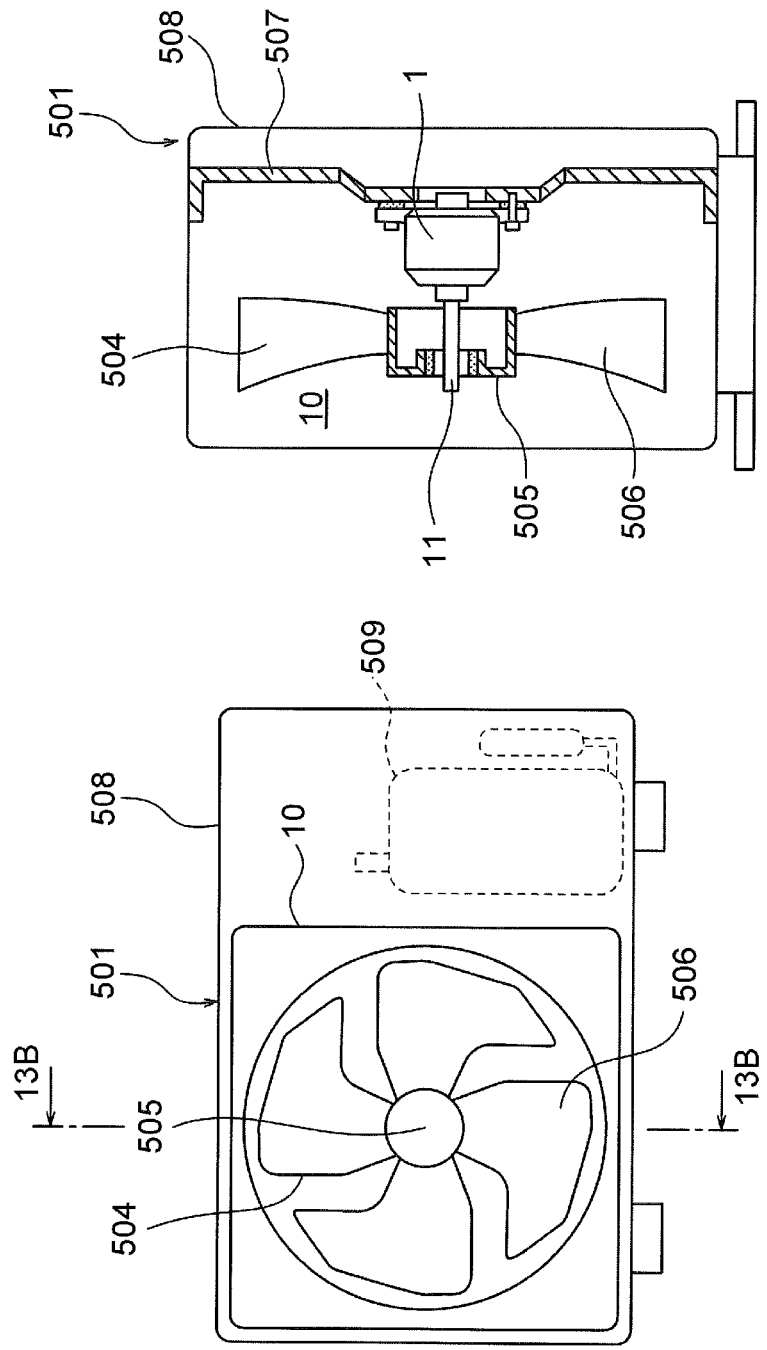

US 11,394,260 B2

ROTOR, MOTOR, FAN, AND AIR CONDITIONING APPARATUS

CROSS REFERENCE TO RELATED APPLICATION

This application is a U.S. national stage application of International Patent Application No. PCT/JP2017/028371 filed on Aug. 4, 2017, the disclosure of which is incorporated herein by reference.

TECHNICAL FIELD

The present invention relates to a rotor, a motor, a fan, an air conditioning apparatus, and a manufacturing method of a rotor.

BACKGROUND

Conventionally, there is known a rotor of a motor in which a rotor core is divided into an inner rotor core and an outer rotor core, and a space therebetween is filled with resin (see, e.g., Patent Literature 1).

PATENT LITERATURE

Patent Literature 1: Japanese Patent Application Publication No. 2004-297935 (see FIG. 2)

However, in the configuration in which the space between the inner rotor core and the outer rotor core is filled with resin as described above, since the resin portion is small, the adjustment range of the resonant frequency of the rotor is narrow. Thus, when the motor is used in a fan, it is difficult to reduce torsional resonance of the motor and impeller or resonance of a unit including the fan, and noise can occur.

SUMMARY

The present invention has been made to solve the above problem, and is intended to provide a rotor, a motor, a fan, an air conditioning apparatus, and a manufacturing method of a rotor capable of reducing noise.

A rotor according to the present invention includes: a shaft; a rotor core having an annular shape and surrounding the shaft from outside in a radial direction about a center axis line of the shaft so as to leave a space therebetween; a magnet embedded in the rotor core; and a connecting portion disposed between the shaft and the rotor core and formed of a nonmagnetic material.

Another rotor according to the present invention includes: a shaft; a rotor core having an annular shape and surrounding the shaft from outside in a radial direction about a center axis line of the shaft so as to leave a space therebetween; a magnet mounted to the rotor core; and a connecting portion disposed between the shaft and the rotor core and formed of a nonmagnetic material. The magnet forms a first magnetic pole, and a part of the rotor core forms a second magnetic pole.

According to the present invention, since a connecting portion formed of a nonmagnetic material is disposed between a shaft and a rotor core, it is possible to adjust a resonant frequency of the rotor by changing the shape and size of the connecting portion, thereby reducing noise. Also, since the rotor core and shaft are separated by the connecting portion, it is possible to reduce magnetic flux leakage from the rotor core to the shaft, improving the performance of a motor.

BRIEF DESCRIPTION OF DRAWINGS

FIGS. 13A and 13B are respectively a front view and sectional view illustrating an outdoor unit of the air conditioning apparatus illustrated in FIG. 12.

DETAILED DESCRIPTION

Embodiments of the present invention will be described below in detail with reference to the drawings. The embodiments are not intended to limit the invention.

First Embodiment

<Configuration of Motor 1>

Figure 1:
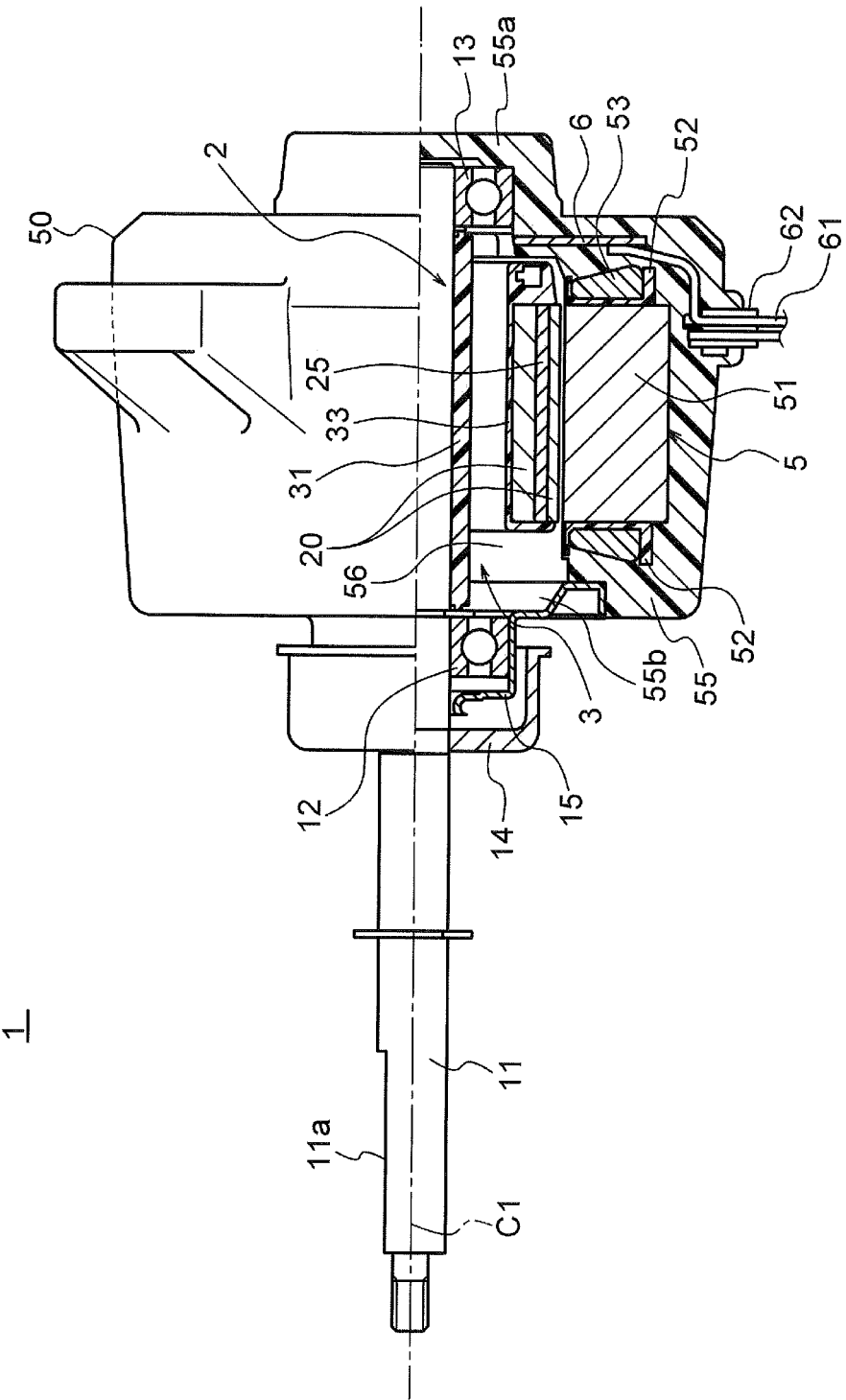
FIG. 1 is a partial sectional view illustrating a motor of a first embodiment.

FIG. 1 is a vertical sectional view illustrating a motor 1 according to a first embodiment of the present invention. For example, the motor 1 is used in a fan of an air conditioning apparatus, and is a brushless DC motor driven by an inverter. The motor 1 is an interior permanent magnet (IPM) motor having a rotor with magnets embedded therein.

The motor 1 includes a rotor 2 including a shaft 11, and a molded stator 50 surrounding the rotor 2. The molded stator 50 includes an annular stator 5 surrounding the rotor 2, and a molded resin portion 55 covering the stator 5. The shaft 11 is a rotation shaft of the rotor 2.

In the following description, a direction of a center axis line C1 of the shaft 11 will be referred to as the "axial direction." A circumferential direction (indicated by arrow R1 in FIGS. 2 and 5) about the center axis line C1 of the shaft 11 will be referred to as the "circumferential direction." A radial direction of the stator 5 and rotor 2 with respect to the center axis line C1 of the shaft 11 will be referred to as the "radial direction." A sectional view taken along a plane parallel to the axial direction will be referred to as a vertical sectional view.

The shaft 11 projects from the molded stator 50 to the left in FIG. 1 and, for example, an impeller 504 (FIG. 13B) of a fan is attached to an attachment portion 11a formed in the projecting portion. Thus, the projecting side (left side in FIG. 1) of the shaft 11 will be referred to as the "load side," and the opposite side (right side in FIG. 1) will be referred to as the "non-load side."

<Configuration of Molded Stator 50>

As described above, the molded stator 50 includes the stator 5 and molded resin portion 55. The stator 5 is disposed to surround the rotor 2 from outside in the radial direction. The stator 5 includes a stator core 51, an insulating portion (insulator) 52 provided on the stator core 51, and coils (windings) 53 wound around the stator core 51 via the insulating portion 52.

The molded resin portion 55 is formed of a thermosetting resin, such as bulk molding compound (BMC). The molded resin portion 55 has a bearing support portion 55a on one side (the right side in FIG. 1) in the axial direction, and an opening portion 55b on the other side (the left side in FIG. 1). The rotor 2 is inserted into a hollow portion 56 in the molded stator 50 through the opening portion 55b.

A metal bracket 15 is attached to the opening portion 55b of the molded resin portion 55. The bracket 15 holds a bearing 12 supporting the shaft 11. A cap 14 for preventing intrusion of water or the like is attached to an outer side of the bracket 15. The bearing support portion 55a of the molded resin portion 55 has a cylindrical inner peripheral surface, and the inner peripheral surface holds another bearing 13 supporting the shaft 11.

Figure 2A:
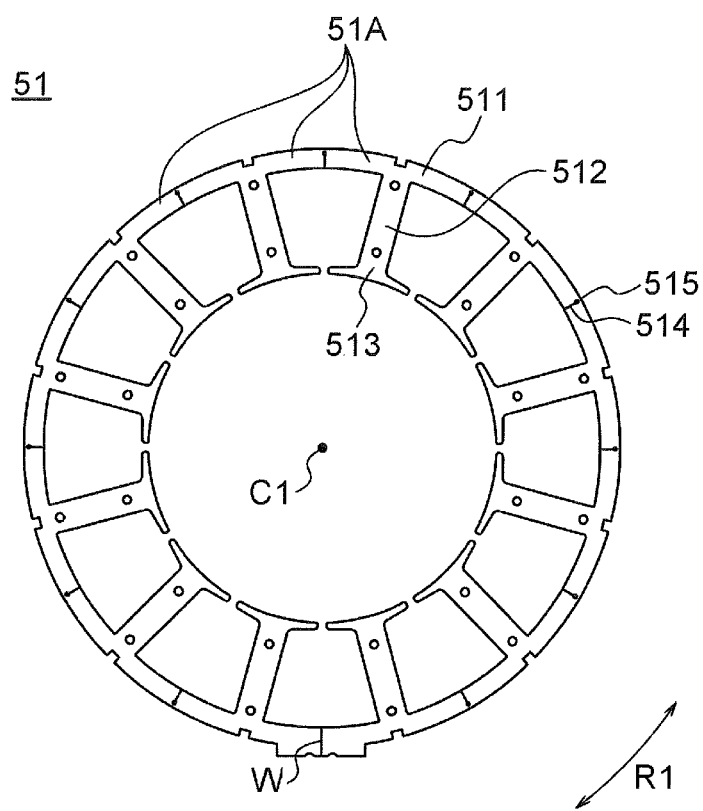
FIG. 2A is a plan view illustrating a stator core of the first embodiment.

FIG. 2A is a plan view illustrating the stator core 51. The stator core 51 is obtained by stacking multiple stacking elements in the axial direction and integrally fixing them by swaging, welding, adhesion, or the like. The stacking elements are, for example, electromagnetic steel sheets. The stator core 51 includes a yoke 511 annularly extending in the circumferential direction about the center axis line C1, and multiple teeth 512 extending from the yoke 511 inward (toward the center axis line C1) in the radial direction. A tooth end 513 of each tooth 512 on the inner side in the radial direction faces an outer peripheral surface of the rotor 2 (FIG. 1). Here, the number of teeth 512 is 12, but this is not mandatory.

The stator core 51 is divided into multiple (here 12) split cores 51A each including one of the teeth 512. The split cores 51A are divided by split surfaces 514 each of which is formed at an intermediate position between adjacent ones of the teeth 512 in the yoke 511. The split surfaces 514 extend from an inner peripheral surface of the yoke 511 outward in the radial direction. Plastically deformable thin portions 515 are formed between ends of the split surfaces 514 and the outer peripheral surface of the yoke 511. Plastic deformation of the thin portions 515 allows the stator core 51 to be unrolled into a flat shape.

Such a configuration allows the coils 53 to be wound around the teeth 512 in a state where the stator core 51 is unrolled into a flat shape. After the winding of the coils 53, the stator core 51 in a flat shape is transformed into an annular shape, and the ends (indicated by character W in FIG. 2A) are welded.

When the stator core 51 has such a divided structure, it is lower in rigidity than an undivided stator core; however, since it is covered by the molded resin portion 55 (e.g., BMC) as described above, deformation of the stator core 51 due to exciting force of the motor 1 is reduced. The stator core 51 need not necessarily have a divided structure.

Figure 2B:
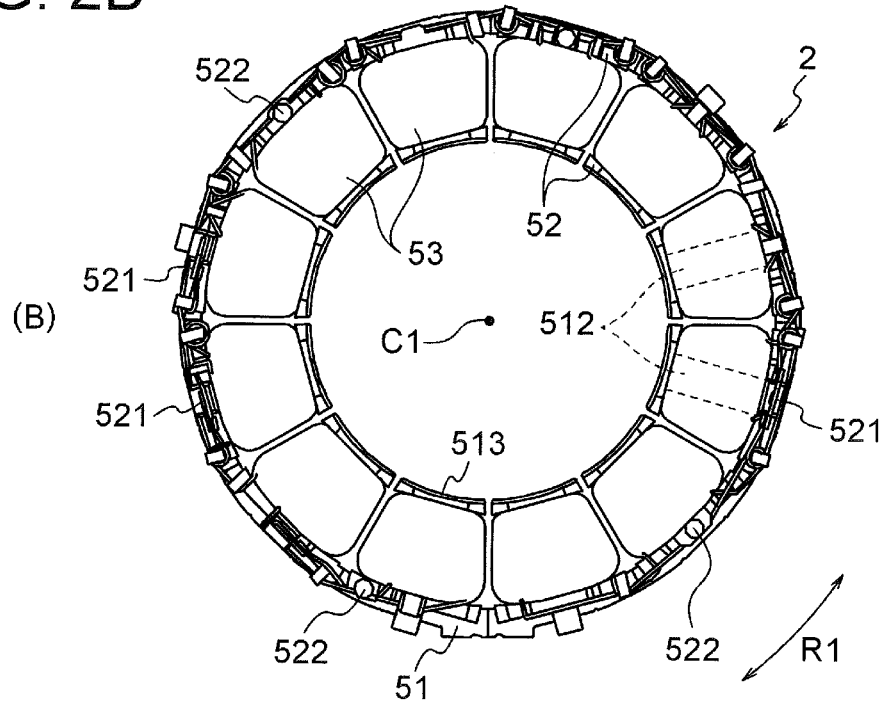
FIG. 2B is a plan view illustrating a state where coils are wound around the stator core via an insulating portion.

FIG. 2B is a plan view illustrating a state where the insulating portion 52 is provided on the stator core 51 and the coils 53 are wound around the stator core 51. The insulating portion 52 is formed of, for example, a thermoplastic resin, such as polybutylene terephthalate (PBT). The insulating portion 52 is formed integrally with the stator core 51 or formed by attaching a molded body of thermoplastic resin to the stator core 51.

The insulating portion 52 surrounds the teeth 512 of the stator core 51. The insulating portion 52 includes wall portions on inner sides of the coils 53 in the radial direction and wall portions on outer sides of the coils 53 in the radial direction (see FIG. 1). Terminals 521 to which the coils 53 are connected and projections 522 to which a board 6 to be described later is fixed are disposed on the wall portions of the insulating portion 52 on the outer sides in the radial direction.

The coils 53 are obtained by winding magnet wire around the teeth 512 via the insulating portion 52. Ends of the magnet wire are connected to the terminals 521 by fusing, soldering, or the like.

Returning to FIG. 1, the board 6 is disposed on one side, here the non-load side (right side in FIG. 1), of the stator 5 in the axial direction. The board 6 is a printed board on which a drive circuit, including a power transistor or the like, for driving the motor 1, a magnetic sensor, and the like are mounted and on which lead wire 61 is arranged.

The board 6 has mounting holes that engage the projections 522 (FIG. 2B) of the stator 5. The board 6 is mounted to the stator 5 by engaging the projections 522 with the mounting holes of the board 6 and thermally or ultrasonically welding projecting portions of the projections 522. The lead wire 61 of the board 6 is drawn out of the motor 1 through a lead wire outlet part 62 mounted in an outer peripheral portion of the molded resin portion 55.

The bracket 15 is press-fitted into an annular portion provided at an outer peripheral edge of the opening portion 55b of the molded resin portion 55. The bracket 15 is formed of conductive metal, such as galvanized steel sheet, but this is not mandatory. The cap 14 is mounted on the outer side of the bracket 15 and prevents intrusion of water or the like into the bearing 12.

<Configuration of Rotor 2>

Figure 3:
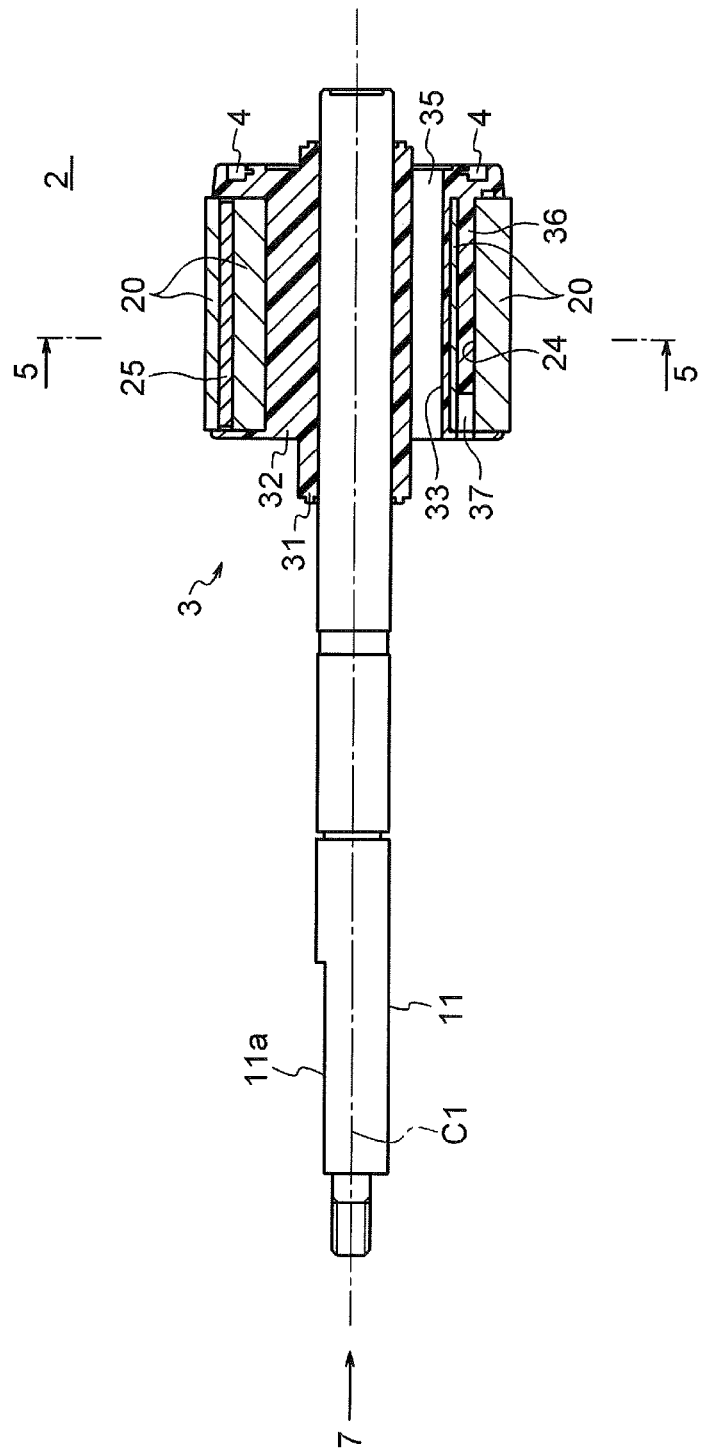
FIG. 3 is a vertical sectional view illustrating a rotor of the first embodiment.
Figure 4:
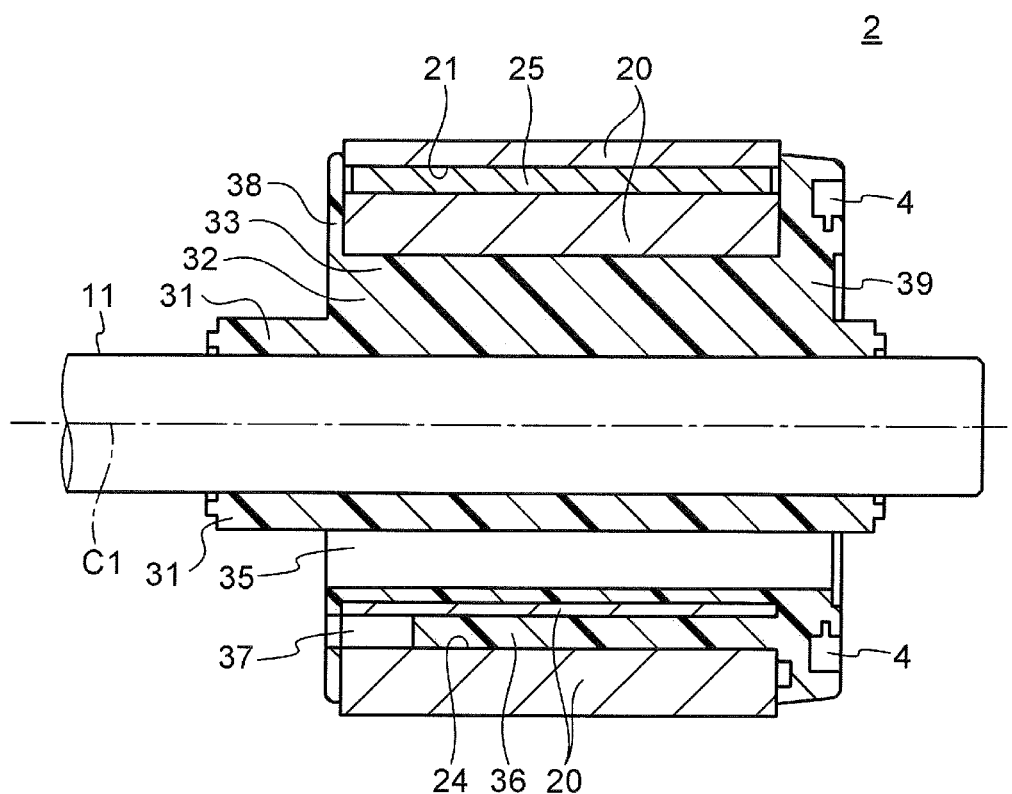
FIG. 4 is an enlarged vertical sectional view illustrating the rotor of the first embodiment.
Figure 5:
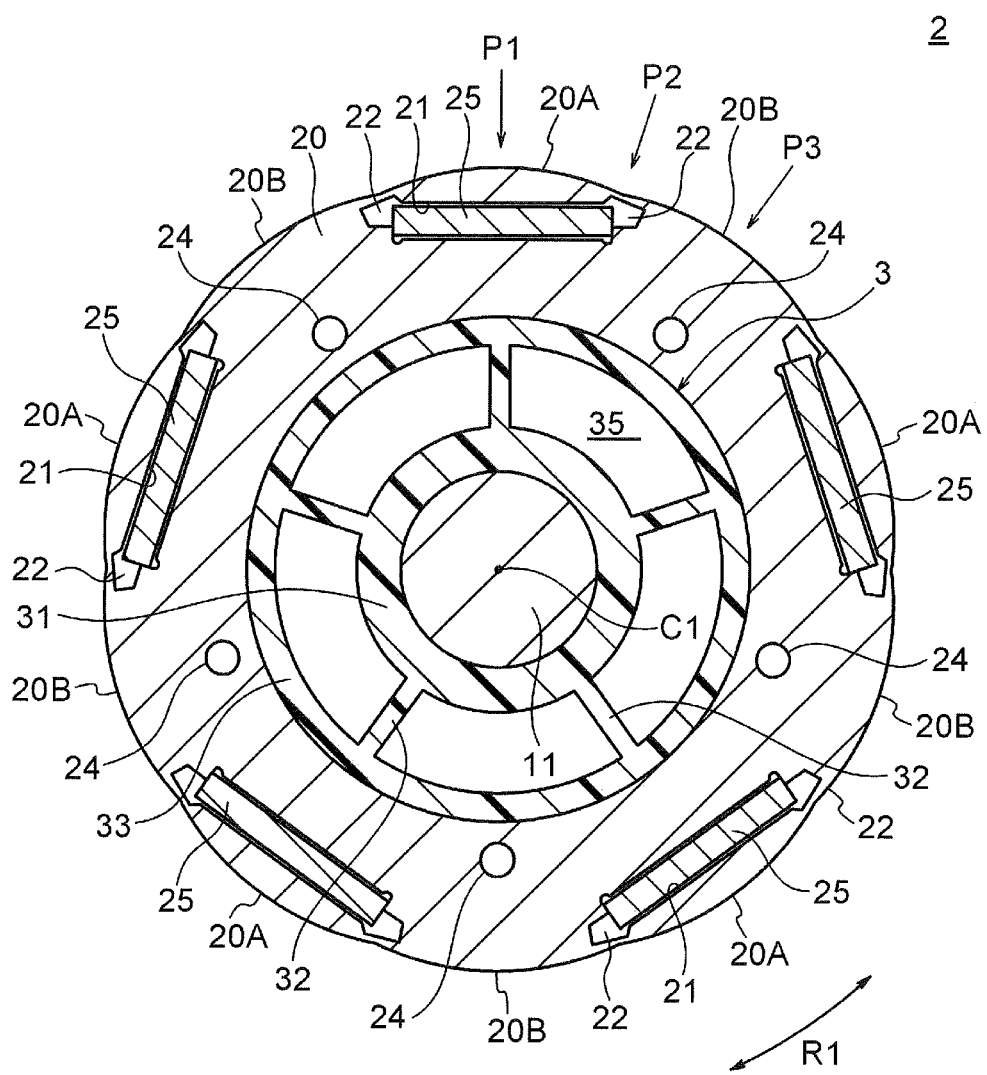
FIG. 5 is a sectional view illustrating the rotor of the first embodiment.

FIG. 3 is a vertical sectional view illustrating the rotor 2. FIG. 4 is an enlarged vertical sectional view illustrating a part of the rotor 2. FIG. 5 is a sectional view taken along line 5-5 in FIG. 3 as viewed in the direction of the arrows.

As illustrated in FIG. 5, the rotor 2 includes the shaft 11, which is a rotation shaft, a rotor core 20 disposed on an outer side of the shaft 11 in the radial direction, multiple magnets 25 embedded in the rotor core 20, and a connecting portion 3 that supports the rotor core 20 with respect to the shaft 11. Here, the number of magnets 25 is five. The magnets 25 are also referred to as the main magnets or rotor magnets.

The rotor core 20 is an annular member centered on the center axis line C1. The rotor core 20 is obtained by stacking multiple stacking elements made of a soft magnetic material in the axial direction and fixing them by swaging, welding, adhesion, or the like. The stacking elements are, for example, electromagnetic steel sheets, and each have a thickness of 0.1 mm to 0.7 mm.

The rotor core 20 has multiple magnet insertion holes 21 arranged in the circumferential direction. The magnet insertion holes 21 are arranged at regular intervals in the circumferential direction and arranged at equal distances from the center axis line C1. Here, the number of magnet insertion holes 21 is five. The magnet insertion holes 21 are arranged at an outer peripheral portion of the rotor core 20, and pass through the rotor core 20 in the axial direction.

The magnets 25 are inserted in the respective magnet insertion holes 21. The magnets 25 each have a plate shape whose cross-section perpendicular to the axial direction is rectangular. The magnets 25 each have a thickness of 2 mm, for example.

The magnets 25 are rare-earth magnets, more specifically, neodymium sintered magnets made mainly of neodymium (Nd), iron (Fe), and boron (B). A flux barrier 22, which is a gap, is formed at each end of each magnet insertion hole 21 in the circumferential direction. The flux barriers 22 reduce short circuiting of magnetic flux (i.e., flux leakage) between adjacent magnets 25.

The magnets 25 are arranged with their like magnetic poles (e.g., north poles) facing toward the outer periphery of the rotor core 20. In the rotor core 20, magnetic poles (e.g., south poles) opposite in polarity to those of the magnets 25 are formed in the regions between magnets 25 adjacent to each other in the circumferential direction.

Thus, in the rotor 2, five first magnetic poles (e.g., north poles) 20A and five second magnetic poles (e.g., south poles) 20B are alternately arranged in the circumferential direction. Thus, the rotor 2 has ten magnetic poles. The ten magnetic poles 20A and 20B of the rotor 2 are arranged at regular angular intervals in the circumferential direction with a pole pitch of 36 degrees (360 degrees/10).

Thus, while five magnetic poles (the first magnetic poles 20A), which are a half of the ten magnetic poles 20A and 20B of the rotor 2, are formed by the magnets 25, the remaining five magnetic poles (the second magnetic poles 20B) are formed by the rotor core 20. Such a configuration is referred to as a consequent pole type. Hereinafter, when "magnetic poles" is simply used, it includes both the magnet magnetic poles and pseudo magnetic poles.

In the consequent pole type rotor 2, the number of magnetic poles is an even number of four or more. The outer periphery of the rotor core 20 has a so-called flower circle (or wavy circle) shape. Specifically, the outer periphery of the rotor core 20 has a shape such that the outer diameter is maximum at pole centers (centers of the respective magnetic poles in the circumferential direction) P1 and P3, the outer diameter is minimum at interpolar portions P2 (between adjacent magnetic poles), and the sections from the pole centers P1 and P3 to the interpolar portions P2 are arc-shaped. Here, the pole centers P1 are centers of the first magnetic poles 20A, and the pole centers P3 are centers of the second magnetic poles 20B.

The number of magnets 25 of the consequent pole type rotor 2 can be half the number of magnets of a rotor having the same number of poles. Since the number of magnets 25, which are expensive, is small, the manufacturing cost of the rotor 2 is reduced. Here, the number of poles of the rotor 2 is ten, but it only needs to be an even number of four or more. Also, the first magnetic poles 20A may be south poles, and the second magnetic poles 20B may be north poles.

In the rotor core 20, multiple holes 24 are formed on an inner side of the magnet insertion holes 21 in the radial direction. The number of holes 24 is, for example, half the number of poles, and here is five. The holes 24 are located at equal distances from the center axis line C1 (i.e., on the same circle).

The holes 24 are formed on inner sides of the second magnetic poles 20B in the radial direction and at pole centers of the second magnetic poles 20B in the circumferential direction. Since these positions are positions through which a significantly small amount of magnetic flux (effective magnetic flux) contributing drive force of the motor 1 passes, the holes 24 do not interrupt the effective magnetic flux.

The holes 24 are for engaging a positioning projection 88 of a molding mold 9 (FIG. 10) to be described later and positioning the rotor core 20 in the molding mold 9. Here, in the circumferential direction, the positions of the respective holes 24 coincide with the pole centers of the second magnetic poles 20B, but such an arrangement is not mandatory. It is sufficient that the holes 24 be located at equal distances from the center axis line C1 and located at equal distances from the nearest magnetic poles in the circumferential direction (that is, it is sufficient that the holes 24 be located at the same relative position to the magnetic poles). Such an arrangement allows any of the holes 24 of the rotor core 20 to be engaged with the projection 88 of the molding mold 9.

By setting the number of holes 24 to half the number of poles and making the positions of the respective holes 24 in the circumferential direction coincide with the pole centers of the second magnetic poles 20B, the weight balance of the rotor core 20 in the circumferential direction is improved. The number of holes 24 is not limited to half the number of poles.

The connecting portion 3 is disposed between the shaft 11 and the rotor core 20. The connecting portion 3 is formed of a nonmagnetic material. The connecting portion 3 preferably has an electrical insulation property. The connecting portion 3 is formed preferably of a resin, and more preferably of a thermoplastic resin, such as PBT.

The connecting portion 3 includes an inner annular portion 31 having an annular shape and contacting an outer peripheral surface of the shaft 11, an outer annular portion 33 having an annular shape and contacting an inner peripheral surface of the rotor core 20, and multiple ribs 32 connecting the inner annular portion 31 and the outer annular portion 33. The ribs 32 are arranged about the center axis line C1 at regular intervals in the circumferential direction. The number of ribs 32 is, for example, half the number of poles, and here is five.

The shaft 11 passes through the inner annular portion 31 of the connecting portion 3. The ribs 32 are arranged at regular intervals in the circumferential direction and radially extend from the inner annular portion 31 outward in the radial direction. Hollow portions 35 are formed between ribs 32 adjacent to each other in the circumferential direction. The hollow portions 35 preferably pass through the rotor 2 in the axial direction.

Here, the number of ribs 32 is half the number of poles, and the positions of the respective ribs 32 in the circumferential direction coincide with the pole centers of the first magnetic poles 20A (or centers of the magnets 25 in the circumferential direction). This improves the weight balance of the rotor 2 in the circumferential direction. The number of ribs 32 is not limited to half the number of poles.

A resonant frequency of the rotor 2 can be adjusted by changing the shape and size of the connecting portion 3 (in particular widths and lengths of the ribs 32), and thus the adjustment range of the resonant frequency of the rotor 2 is wide. This reduces torsional resonance of the motor 1 and the impeller fixed thereto, and resonance of a unit including the fan, and reduces noise.

Since the consequent pole type rotor 2 has no actual magnets at the pseudo magnetic poles (i.e., second magnetic poles 20B), it has the property that magnetic flux passing through the pseudo magnetic poles easily flows into the shaft 11. The configuration in which the shaft 11 and rotor core 20 are separated from each other by the connecting portion 3 formed of a nonmagnetic material is particularly effective to reduce magnetic flux leakage in the consequent pole type rotor 2.

The connecting portion 3 has an electrical insulation property, and thus the rotor core 20 and shaft 11 are electrically insulated from each other, so that shaft current flowing from the rotor core 20 into the shaft 11 is reduced. This reduces electrolytic corrosion of the bearings 12 and 13 (specifically, damage of raceway surfaces of inner races and outer races and rolling surfaces of rolling elements).

Part of the connecting portion 3 exists in the holes 24 of the rotor core 20 as illustrated in FIG. 4. The part of the connecting portion 3 in the holes 24 is referred to as the filling portion 36. Such existence of part of the connecting portion 3 in the holes 24 of the rotor core 20 prevents displacement between the rotor core 20 and the connecting portion 3 in the circumferential direction.

Also, formation of the holes 24 of the rotor core 20 on inner sides of the pseudo magnetic poles (i.e., second magnetic poles 20B) in the radial direction further enhances the effect of reducing flow of magnetic flux from the pseudo magnetic poles toward the shaft 11.

Figure 6:
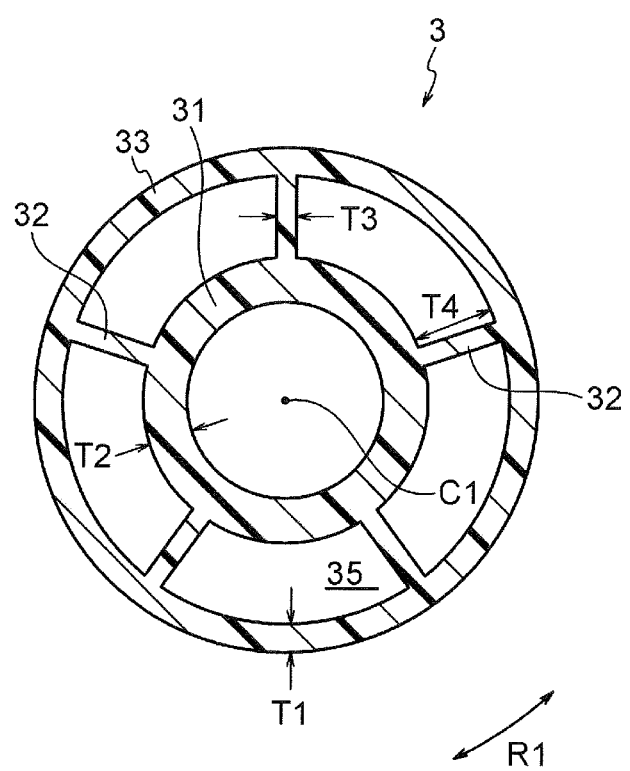
FIG. 6 is a sectional view illustrating a connecting portion of the rotor of the first embodiment.

FIG. 6 is a sectional view illustrating the connecting portion 3 of the rotor 2 and being perpendicular to the center axis line C1. As illustrated in FIG. 6, a width (dimension) of the outer annular portion 33 in the radial direction is denoted by T1, and a width of the inner annular portion 31 in the radial direction is denoted by T2. A width of the ribs 32 in the circumferential direction is denoted by T3, and a length of the ribs 32 in the radial direction is denoted by T4.

Here, the widths T1, T2, and T3 are set to satisfy T1>T3 and T2>T3. This will be described below.

The resonant frequency (natural frequency) of the rotor 2 increases as the length T4 of the ribs 32 decreases, and increases as the width T3 of the ribs 32 increases. Meanwhile, the sum (T1+T2+T4) of T1, T2, and T4, which are dimensions in the radial direction, is restricted by an outer diameter of the shaft 11 and an inner diameter of the rotor core 20.

Thus, in designing the rotor 2 to have a desired resonant frequency, there are a method (1) of decreasing the width T1 of the outer annular portion 33 and the width T2 of the inner annular portion 31 and increasing the length 14 and width T3 of the ribs 32, and a method (2) of increasing the width T1 of the outer annular portion 33 and the width T2 of the inner annular portion 31 and decreasing the length T4 and width T3 of the ribs 32.

However, since the length 14 of the ribs 32 dominantly affects the resonant frequency, in the method (1), it is necessary to greatly increase the width T3 while decreasing the widths T1 and T2. In this case, greatly increasing the width T3 of the ribs 32 narrows the hollow portions 35 and thus increases the amount of resin used to form the connecting portion 3, which is undesirable.

Thus, the method (2) of increasing the width T1 of the outer annular portion 33 and the width T2 of the inner annular portion 31 and decreasing the length T4 and width T3 of the ribs 32 is preferable. This widens the hollow portions 35 of the connecting portion 3 and allows the amount of used resin to be reduced. Further, increasing the width T1 of the outer annular portion 33 contacting the rotor core 20 and the width T2 of the inner annular portion 31 contacting the shaft 11 can improve resistance to thermal shock due to difference in thermal expansion between the rotor core 20, connecting portion 3, and shaft 11, and prevent the connecting portion 3 from being broken by thermal shock.

From the above, it is preferable that the width T1 of the outer annular portion 33 and the width T2 of the inner annular portion 31 be both greater than the width T3 of the ribs 32. That is, it is preferable that T1>T3 and T2>T3 be satisfied.

As illustrated in FIG. 4, the connecting portion 3 has an end surface portion 38 covering one end surface (left end surface in FIG. 4) of the rotor core 20 in the axial direction, and an end surface portion 39 covering the other end surface (right end surface in FIG. 4) of the rotor core 20 in the axial direction. The end surface portions 38 and 39 are formed continuously with the above-described inner annular portion 31, ribs 32, and outer annular portion 33. The end surface portion 38 need not completely cover the end surface of the rotor core 20, and only needs to cover at least part of the end surface. The same applies to the end surface portion 39.

The end surface portions 38 and 39 of the connecting portion 3 also cover both end surfaces in the axial direction of the magnets 25 inserted in the magnet insertion holes 21 of the rotor core 20. This prevents the magnets 25 from coming out of the magnet insertion holes 21. Further, since the magnets 25 are not exposed to the outside, degradation of the magnets 25 over time is reduced.

Figure 7:
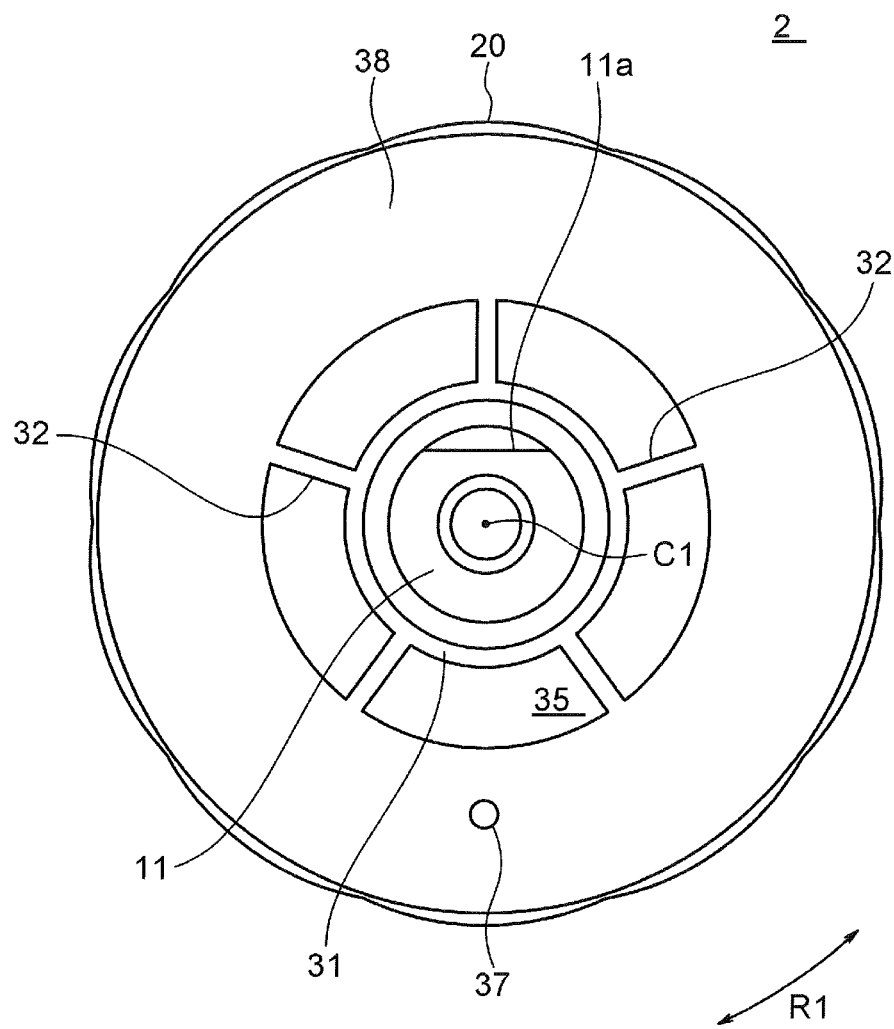
FIG. 7 is a view illustrating the rotor of the first embodiment.
Figure 10:
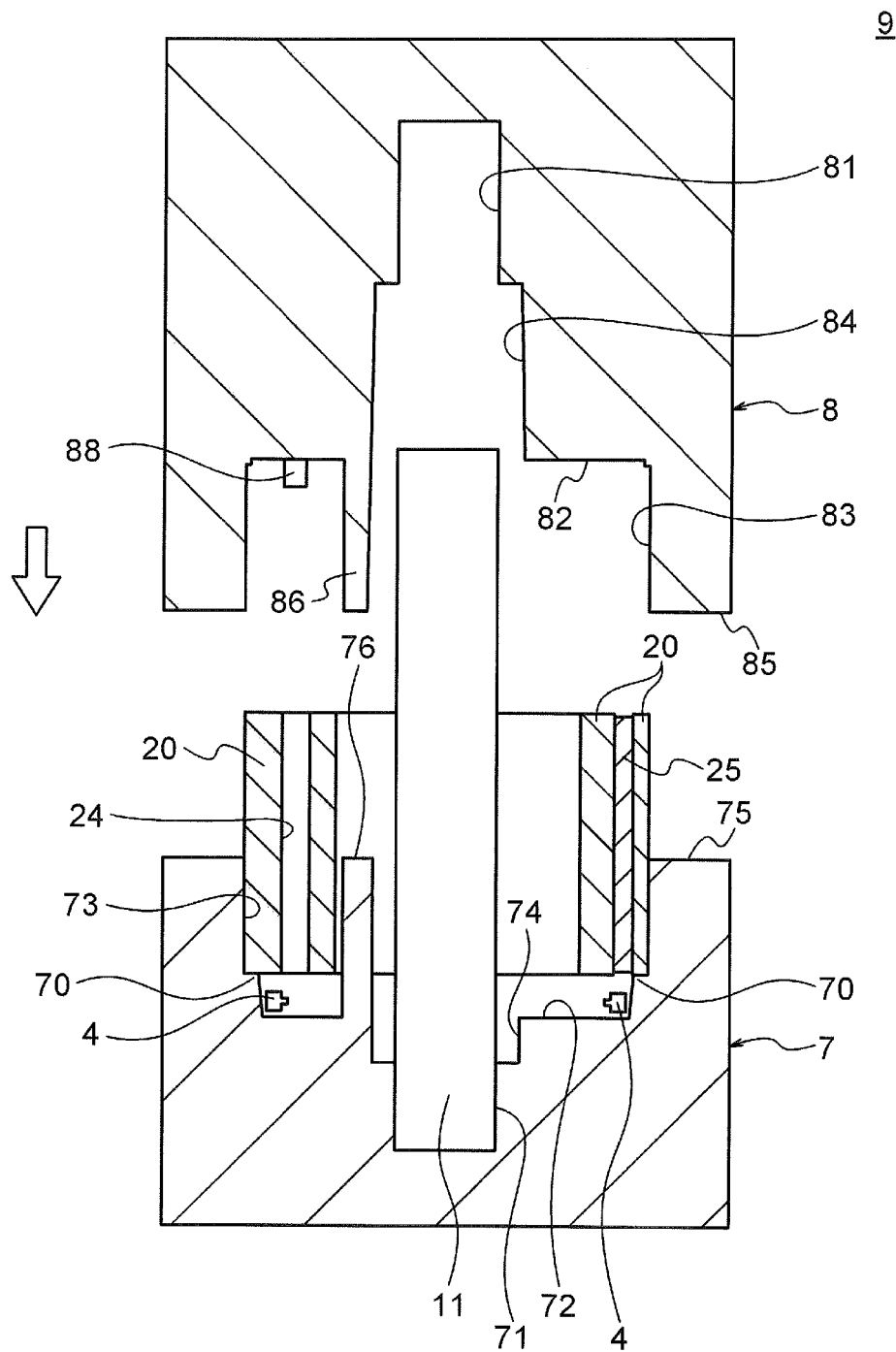
FIG. 10 is a vertical sectional view illustrating a molding mold of the first embodiment.

FIG. 7 is a view of the rotor 2 as viewed in the direction indicated by arrow 7 of FIG. 3. A hole portion (referred to as the resin hole portion) 37 is formed in the end surface portion 38 covering the end surface of the rotor core 20. The resin hole portion 37 is a hole resulting from resin failing to enter a portion of the multiple holes 24 of the rotor core 20 engaged with the projection 88 of the molding mold 9 (FIG. 10).

Returning to FIG. 4, an annular sensor magnet 4 as a position detection magnet is mounted on one side (the right side in FIG. 4) of the rotor core 20 in the axial direction. The sensor magnet 4 is covered by the end surface portion 39 of the connecting portion 3 from inside and outside in the radial direction.

The sensor magnet 4 has the same number of (here ten) magnetic poles as the number of poles of the rotor 2. A magnetic field of the sensor magnet 4 is detected by the magnetic sensor mounted on the board 6, and thereby the position (rotational position) of the rotor 2 in the circumferential direction is detected.

Figure 8:
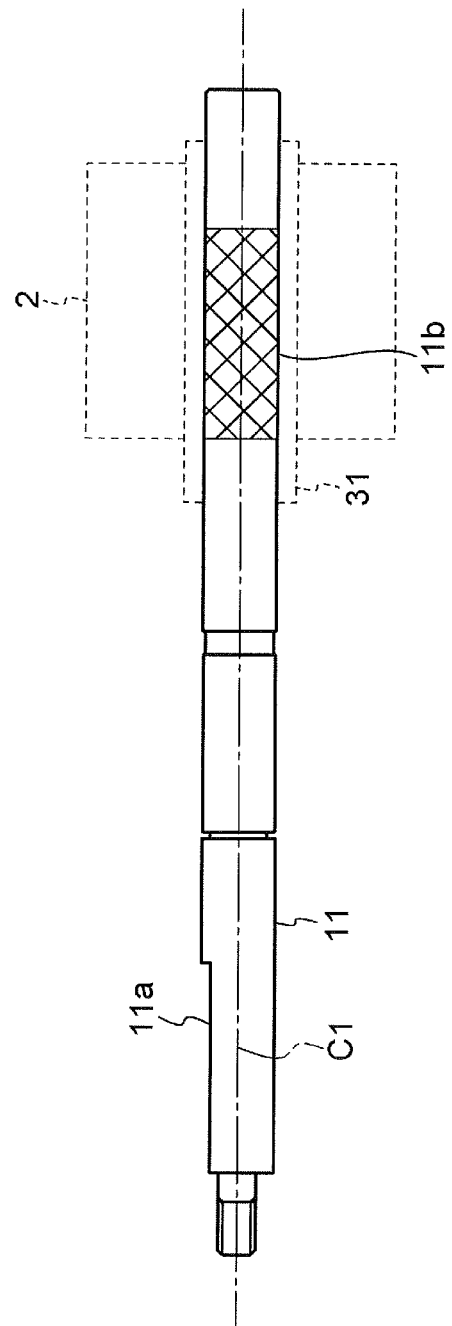
FIG. 8 is a view illustrating a shaft of the rotor of the first embodiment.

FIG. 8 is a view illustrating a shape of the shaft 11. A knurled portion (or uneven portion) 11b is formed on a part of the outer peripheral surface of the shaft 11 contacting the inner peripheral surface of the inner annular portion 31 of the connecting portion 3. Part of the resin forming the connecting portion 3 enters recesses of the knurled portion 11b of the shaft 11 and is cured in an integral molding process to be described later, thereby preventing displacement between the shaft 11 and the connecting portion 3 in the circumferential direction and axial direction.

<Manufacturing Process of Rotor 2>

A manufacturing process of the rotor 2 will now be described. The rotor 2 is manufactured by integrally molding the shaft 11 and rotor core 20 with resin. Here, the sensor magnet 4 is also integrally molded with resin together with the shaft 11 and rotor core 20.

Figure 9:
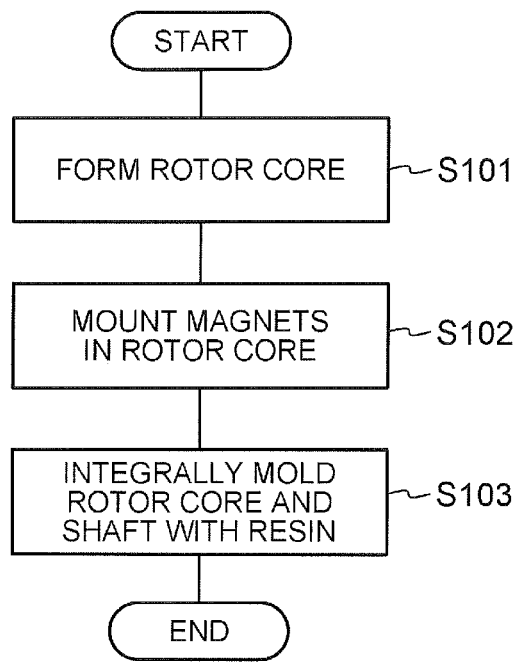
FIG. 9 is a flowchart illustrating a manufacturing process of the rotor of the first embodiment.

FIG. 9 is a flowchart illustrating a manufacturing process of the rotor 2. First, the rotor core 20 is formed by stacking electromagnetic steel sheets and fixing them by swaging or the like (step S101). Then, the magnets 25 are inserted into the magnet insertion holes 21 of the rotor core 20 (step S102).

Then, the rotor core 20 and shaft 11 (here as well as the sensor magnet 4) are placed in the molding mold 9, and integrally molded with resin, such as PBT (step S103).

FIG. 10 is a vertical sectional view illustrating the molding mold 9. The molding mold 9 includes a fixed mold (lower mold) 7 and a movable mold (upper mold) 8. The fixed mold 7 and movable mold 8 have mold mating surfaces 75 and 85 facing each other.

The fixed mold 7 has a shaft insertion hole 71 in which one end of the shaft 11 is inserted, a rotor core insertion portion 73 in which the rotor core 20 is inserted, a facing surface 72 that faces an end surface (here lower surface) of the rotor core 20 in the axial direction, an abutment portion 70 that abuts an outer peripheral portion of the end surface of the rotor core 20 in the axial direction, a cylindrical portion 74 that faces the outer peripheral surface of the shaft 11, and hollow forming portions 76 that are inserted inside the rotor core 20.

The movable mold 8 has a shaft insertion hole 81 in which the other end of the shaft 11 is inserted, a rotor core insertion portion 83 in which the rotor core 20 is inserted, a facing surface 82 that faces an end surface (here upper surface) of the rotor core 20 in the axial direction, a cylindrical portion 84 that faces the periphery of the shaft 11, and hollow forming portions 86 that are inserted inside the rotor core 20. The movable mold 8 also has the positioning projection 88 projecting from the facing surface 82. Here, the number of projections 88 is one, but it only needs to be less than or equal to the number of the holes 24 of the rotor core 20.

In molding, the shaft 11 is inserted into the shaft insertion hole 71 of the fixed mold 7, and the sensor magnet 4 is placed on the facing surface 72 of the fixed mold 7.

Then, the rotor core 20 is inserted into the rotor core insertion portion 73. At this time, the outer peripheral portion of the lower surface of the rotor core 20 abuts the abutment portion 70, and a space is formed between the lower surface of the rotor core 20 and the facing surface 72.

Then, the movable mold 8 is moved downward as indicated by the arrow in FIG. 10, and the mold mating surfaces 75 and 85 are caused to abut each other. At this time, the projection 88 of the movable mold 8 engages one of the holes 24 of the rotor core 20. The engagement of the projection 88 with the hole 24 positions the rotor core 20 in the molding mold 9.

Here, the number of projections 88 of the movable mold 8 is one. On the other hand, the number of holes 24 of the rotor core 20 is two or more (e.g., five). Since, as described above, the multiple holes 24 of the rotor core 20 are located at equal distances from the center axis line C1 and located at equal distances from the nearest magnetic poles in the circumferential direction, any of the holes 24 of the rotor core 20 can be engaged with the projection 88.

Also, in the state where the mold mating surfaces 75 and 85 abut each other, a space is formed between the upper surface of the rotor core 20 and the facing surface 82, in addition to the space formed between the lower surface of the rotor core 20 and the facing surface 72.

In this state, the molding mold 9 is heated, and molten resin, such as PBT, is injected through a runner. The resin fills the inside of the rotor core 20 inserted in the rotor core insertion portions 73 and 83, the insides of the magnet insertion holes 21, and the insides of the holes 24. The resin also fills spaces inside the cylindrical portions 74 and 84, and further fills spaces between the rotor core 20 and the facing surfaces 72 and 82.

After the resin is injected into the molding mold 9 in this manner, the molding mold 9 is cooled. Thereby, the resin is cured, forming the connecting portion 3. Thus, the shaft 11, rotor core 20, and sensor magnet 4 are integrated by the connecting portion 3, so that the rotor 2 is formed.

Specifically, the resin cured between the shaft 11 and the cylindrical portions 74 and 84 of the molding mold 9 forms the inner annular portion 31 (FIG. 4). The resin cured inside the rotor core 20 (but outside the hollow forming portions 76 and 86) forms the inner annular portion 31, ribs 32, and outer annular portion 33 (FIG. 5). The portions corresponding to the hollow forming portions 76 and 86 of the molding mold 9 form the hollow portions 35 (FIG. 5).

Further, the resin cured inside the holes 24 of the rotor core 20 forms the filling portions 36 (FIG. 4). Since no resin flows into a portion of the holes 24 of the rotor core 20 engaged with the projection 88 of the molding mold 9, the portion forms the resin hole portion 37 (FIG. 7). The resin cured between the rotor core 20 and the facing surfaces 72 and 82 of the molding mold 9 forms the end surface portions 38 and 39 (FIG. 4).

Then, the movable mold 8 is moved upward, and the rotor 2 is taken out of the fixed mold 7. This completes the manufacturing of the rotor 2.

Meanwhile, the stator core 51 is formed by stacking electromagnetic steel sheets and fixing them by swaging or the like. The stator 5 is obtained by mounting the insulating portion 52 to the stator core 51 and winding the coils 53 therearound. The board 6 is mounted to the stator 5. Then, the molded resin portion 55 is formed by placing the stator 5 in a molding mold and injecting and heating resin (molding resin), such as BMC. This completes the molded stator 50.

Then, the bearings 12 and 13 are mounted on the shaft 11 of the rotor 2, and it is inserted into the hollow portion 56 through the opening portion 55b of the molded stator 50. Then, the bracket 15 is attached to the opening portion 55b of the molded stator 50. Further, the cap 14 is attached to the outer side of the bracket 15. This completes the motor 1.

Here, the positioning projection 88 is provided in the movable mold 8, but it may be provided in the fixed mold 7. In both cases, the rotor core 20 can be positioned relative to the molding mold 9.

<Advantages of the Embodiment>

As described above, in the first embodiment of the present invention, in the motor (IPM motor) 1 in which the magnets 25 are embedded in the rotor 2, the shaft 11 and rotor core 20 are connected by the connecting portion 3 formed of a nonmagnetic material. Thus, the resonant frequency of the rotor 2 can be adjusted by changing the size and shape of the connecting portion 3, and the adjustment range is wide. This makes it possible to reduce, for example, torsional resonance of the motor 1 and impeller or the like, thereby reducing noise. Further, since the rotor core 20 and shaft 11 are separated from each other by the connecting portion 3, magnetic flux leakage from the rotor core 20 to the shaft 11 can be reduced, and the performance of the motor 1 is improved.

Further, in the first embodiment of the present invention, in the consequent pole type motor 1 with the rotor 2 having the magnet magnetic poles (first magnetic poles 20A) and pseudo magnetic poles (second magnetic poles 20B), the shaft 11 and rotor core 20 are connected by the connecting portion 3 formed of a nonmagnetic material. Thus, the resonant frequency of the rotor 2 can be adjusted by changing the size and shape of the connecting portion 3, and the adjustment range is wide. This makes it possible to reduce, for example, torsional resonance of the motor 1 and impeller or the like, thereby reducing noise. Further, since the rotor core 20 and shaft 11 are separated from each other by the connecting portion 3, magnetic flux leakage from the rotor core 20 to the shaft 11, which easily occurs particularly in the consequent pole type rotor 2, can be reduced, and the performance of the motor 1 is improved.

Further, since the connecting portion 3 has an electrical insulation property, the rotor core 20 and shaft 11 can be electrically insulated from each other, and shaft current flowing from the rotor core 20 into the shaft 11 can be reduced. This can reduce electrolytic corrosion of the bearings 12 and 13.

Further, since the connecting portion 3 includes the ribs 32 extending from the shaft 11 toward the rotor core 20, the hollow portions 35 can be formed adjacent to the ribs 32. Thus, it is possible to reduce the amount of resin used to form the connecting portion 3, and reduce the manufacturing cost. Further, it is possible to widely adjust the resonant frequency of the rotor 2 by changing the shapes (thicknesses, lengths, or the like) of the ribs 32.

Since the connecting portion 3 includes the inner annular portion 31 contacting the outer peripheral surface of the shaft 11, the outer annular portion 33 contacting the inner peripheral surface of the rotor core 20, and the ribs 32 connecting the inner annular portion 31 and outer annular portion 33, the shaft 11 and rotor core 20 can be connected and held.

Further, since the width T1 of the outer annular portion 33 in the radial direction, the width T2 of the inner annular portion 31 in the radial direction, and the width T3 of the ribs 32 in the circumferential direction satisfy T1>T3 and T2>T3, it is possible to reduce material usage by reducing the width T3 of the ribs 32, and improve resistance to thermal shock by increasing the width T1 of the outer annular portion 33 and the width T2 of the inner annular portion 31.

Further, since the knurled portion 11b is formed on the outer periphery of the shaft 11, displacement between the shaft 11 and the connecting portion 3 can be prevented.

Further, since the holes 24 are formed in one end surface of the rotor core 20 in the axial direction, when the rotor core 20 is mounted in the molding mold 9, it is possible to engage the holes 24 with the positioning projection 88 of the molding mold 9 and position the rotor core 20.

Further, since the multiple holes 24 of the rotor core 20 are located at equal distances from the center axis line C1 and located at equal distances from the nearest magnetic poles in the circumferential direction, it is possible to engage the projection 88 with any of the holes 24 of the rotor core 20.

Since the connecting portion 3 includes the end surface portions 38 and 39 covering the end surfaces of the rotor core 20, the magnets 25 can be prevented from coming out of the magnet insertion holes 21.

Further, the rotor core 20 is formed of a stack of stacking elements (e.g., electromagnetic steel sheets). This can reduce eddy current loss and also reduce iron loss, thereby improving the performance of the motor 1.

Further, in the manufacturing process of the rotor 2, the shaft 11 and rotor core 20 are integrally molded with resin. This eliminates the need for press fitting of the shaft 11 or other processes, allowing the manufacturing process of the rotor 2 to be simplified.

The above-described motor 1 is an IPM motor and is of a consequent pole type. However, the configuration described in the first embodiment is also applicable to a motor that is an IPM motor but is not of a consequent pole type, or a motor that is of a consequent pole type but is not an IPM motor.

Modification

Figure 11:
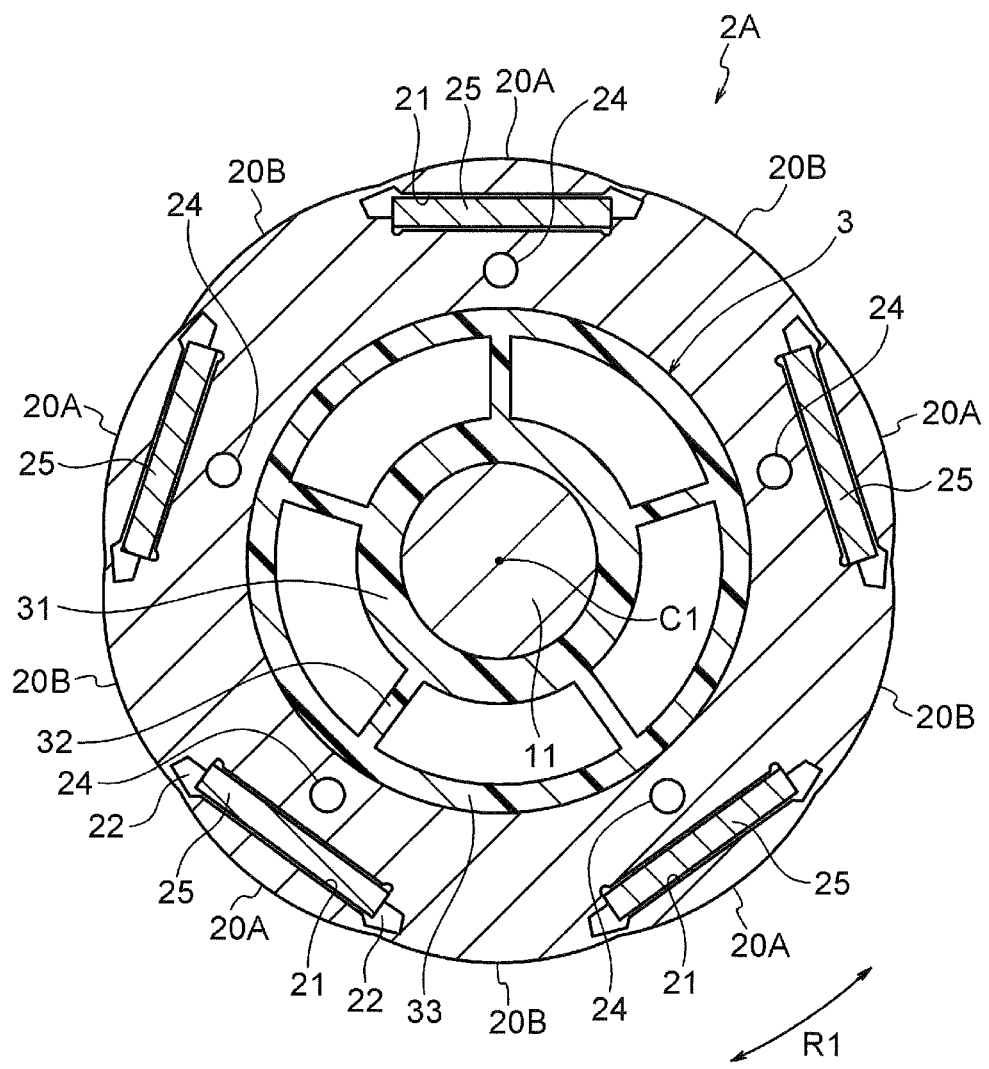
FIG. 11 is a sectional view illustrating a rotor of a modification of the first embodiment.

FIG. 11 is a sectional view illustrating a rotor 2A of a motor of a modification of the first embodiment, and corresponds to a sectional view taken along line 5-5 in FIG. 3 as viewed in the direction of the arrows. The rotor 2A of this modification differs from the rotor 2 of the first embodiment in the positions of the holes 24 of the rotor core 20.

In the above-described first embodiment, as illustrated in FIG. 5, the holes 24 of the rotor core 20 are located at the pole centers of the second magnetic poles 20B (i.e., pseudo magnetic poles) in the circumferential direction. On the other hand, in the modification illustrated in FIG. 11, the holes 24 of the rotor core 20 are located at the pole centers of the first magnetic poles 20A (i.e., magnet magnetic poles) in the circumferential direction. Here, the number of holes 24 is five.

Also in this modification, it is possible to position the rotor core 20 in the molding mold 9 by engaging the positioning projection 88 of the molding mold 9 (FIG. 10) with one of the holes 24 of the rotor core 20. Further, since the holes 24 are located at the same relative position to the magnetic poles, it is possible to engage the projection 88 with any of the holes 24 of the rotor core 20. The motor of the modification is configured in the same manner as the motor 1 of the first embodiment except for the positions of the holes 24 of the rotor core 20.

Since in the consequent pole type rotor 2, flow of magnetic flux from the second magnetic poles 20B (pseudo magnetic poles) toward the shaft 11 easily occurs, the effect of reducing magnetic flux leakage is higher when the holes 24 are formed at the pole centers of the second magnetic poles 20B as illustrated in FIG. 5 of the above first embodiment.

<Air Conditioning Apparatus>

Figure 12:
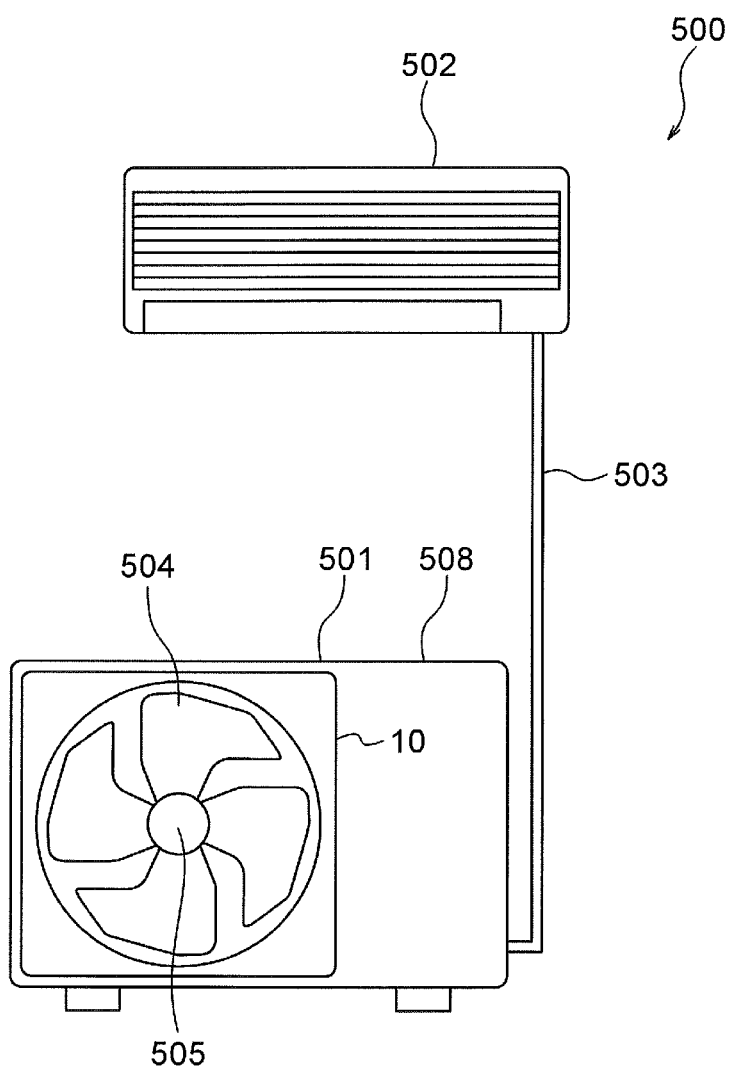
FIG. 12 is a view illustrating an exemplary configuration of an air conditioning apparatus to which the motor of the first embodiment and a motor of the modification are applied.

An air conditioning apparatus to which the motor of the above-described first embodiment or its modification is applied will now be described. FIG. 12 is a view illustrating a configuration of an air conditioning apparatus 500 to which the motor 1 of the first embodiment is applied. The air conditioning apparatus 500 includes an outdoor unit 501, an indoor unit 502, and refrigerant piping 503 connecting these. The outdoor unit 501 includes an outdoor fan 10 as a fan.

FIG. 13A is a front view illustrating a configuration of the outdoor unit 501. The outdoor unit 501 includes a housing 508 and a frame 507 fixed in the housing 508. FIG. 13A also illustrates a compressor 509 that compresses refrigerant.

FIG. 13B is a sectional view taken along line 13B-13B in FIG. 13A as viewed in the direction of the arrows. The outdoor fan 10 includes the motor 1 mounted to the frame 507, and the impeller 504 attached to the shaft 11 of the motor 1. The impeller 504 includes a hub 505 fixed to the shaft 11 and blades 506 extending from the hub 505 outward in the radial direction.

As the rotor 2 of the motor 1 rotates, the impeller 504 attached to the shaft 11 rotates and blows air outdoors. During cooling operation of the air conditioning apparatus 500, heat discharged when refrigerant compressed by the compressor 509 is condensed in a condenser (not illustrated) is discharged outdoors by the outdoor fan 10 blowing air.

Since the resonant frequency of the motor 1 of the above-described first embodiment is widely adjustable, it is possible to reduce resonance of the motor 1 and impeller 504 and resonance of a unit (or the outdoor unit 501) including the outdoor fan 10, and reduce noise. The rotor 2A of the modification (FIG. 12) may be used in the motor 1.

Although here the outdoor fan 10 of the outdoor unit 501 has been described, the same configuration may be employed in a fan of the indoor unit 502.

The motors 1 described in the first embodiment and modification can also be mounted to electrical devices other than fans of air conditioning apparatuses.

Although preferred embodiments of the present invention have been specifically described above, the invention is not limited to the above-described embodiments, and various modifications or changes can be made without departing from the gist of the invention.

The invention claimed is:

1. A rotor comprising:
a shaft;
a rotor core having an annular shape and surrounding the shaft from outside in a radial direction about a center axis line of the shaft so as to leave a space therebetween;
a magnet embedded in the rotor core; and
a connecting portion disposed between the shaft and the rotor core and formed of a nonmagnetic material,
wherein the connecting portion has an inner annular portion contacting an outer periphery of the shaft, an outer annular portion contacting an inner periphery of the rotor core, and a rib connecting the inner annular portion and the outer annular portion, and
wherein T1>T3 and T2>T3 are satisfied, where T1 is a width of the outer annular portion in the radial direction, T2 is a width of the inner annular portion in the radial direction, and T3 is a width of the rib in a circumferential direction about the center axis line.

2. The rotor according to claim 1, wherein the nonmagnetic material has an electrical insulation property.

3. The rotor according to claim 1, wherein an outer periphery of the shaft is knurled.

4. The rotor according to claim 1, wherein the connecting portion has an end surface portion covering at least a part of an end surface of the rotor core in a direction of the center axis line.

5. The rotor according to claim 1, wherein the rotor core has a hole at an end surface thereof in a direction of the center axis line.

6. The rotor according to claim 1, wherein the rotor core has a plurality of holes located at equal distances from the center axis line, and
wherein the plurality of holes are located at equal distances from nearest magnetic poles in a circumferential direction about the center axis line.

7. The rotor according to claim 6, wherein the connecting portion has an end surface portion covering at least a part of an end surface of the rotor core in a direction of the center axis line, and
wherein the end surface portion has one or more hole portions whose number is less than a number of the plurality of holes.

8. The rotor according to claim 1, wherein the rotor core is formed of a stack of stacking elements.

9. A motor comprising:
the rotor according to claim 1; and
a stator surrounding the rotor from outside in the radial direction.

10. A fan comprising:
the motor according to claim 9; and
an impeller fixed to the shaft of the rotor of the motor.

11. An air conditioning apparatus comprising:
an outdoor unit;
an indoor unit; and
refrigerant piping connecting the outdoor unit and the indoor unit,
wherein at least one of the outdoor unit and the indoor unit includes the fan according to claim 10.

12. A rotor comprising:
a shaft;
a rotor core having an annular shape and surrounding the shaft from outside in a radial direction about a center axis line of the shaft so as to leave a space therebetween;
a magnet mounted to the rotor core; and
a connecting portion disposed between the shaft and the rotor core and formed of a nonmagnetic material,
wherein the connecting portion has an inner annular portion contacting an outer periphery of the shaft, an outer annular portion contacting an inner periphery of the rotor core, and a rib connecting the inner annular portion and the outer annular portion,
wherein T1>T3 and T2>T3 are satisfied, where T1 is a width of the outer annular portion in the radial direction, T2 is a width of the inner annular portion in the radial direction, and T3 is a width of the rib in a circumferential direction about the center axis line, and
wherein the magnet forms a first magnetic pole, and a part of the rotor core forms a second magnetic pole.

13. The rotor according to claim 12, wherein the rotor core has a hole on an inner side of the second magnetic pole in the radial direction.

14. The rotor according to claim 12, wherein the nonmagnetic material has an electrical insulation property.

15. The rotor according to claim 12, wherein an outer periphery of the shaft is knurled.

16. The rotor according to claim 12, wherein the connecting portion has an end surface portion covering at least a part of an end surface of the rotor core in a direction of the center axis line.

17. The rotor according to claim 12, wherein the rotor core has a hole at an end surface thereof in a direction of the center axis line.

18. The rotor according to claim 12, wherein the rotor core has a plurality of holes located at equal distances from the center axis line, and
wherein the plurality of holes are located at equal distances from nearest magnetic poles in a circumferential direction about the center axis line.

19. The rotor according to claim 18, wherein the connecting portion has an end surface portion covering at least a part of an end surface of the rotor core in a direction of the center axis line, and
wherein the end surface portion has one or more hole portions whose number is less than a number of the plurality of holes.

20. The rotor according to claim 12, wherein the rotor core is formed of a stack of stacking elements.

21. A motor comprising:
the rotor according to claim 12; and
a stator surrounding the rotor from outside in the radial direction.

22. A fan comprising:
the motor according to claim 21; and
an impeller fixed to the shaft of the rotor of the motor.

23. An air conditioning apparatus comprising:
an outdoor unit;
an indoor unit; and refrigerant piping connecting the outdoor unit and the indoor unit, wherein at least one of the outdoor unit and the indoor unit includes the fan according to claim 22.

\* \* \* \* \*